(12) United States Patent
Hogenson et al.

(10) Patent No.: US 7,296,769 B2
(45) Date of Patent: Nov. 20, 2007

(54) CRYOGENIC FUEL TANK INSULATION ASSEMBLY

(75) Inventors: Peter A. Hogenson, Long Beach, CA (US); Keith Chong, Placentia, CA (US); Peter Duong, La Puente, CA (US)

(73) Assignee: The Boeing Company, Chicago, IL (US)

( * ) Notice: Subject to any disclaimer, the term of this patent is extended or adjusted under 35 U.S.C. 154(b) by 322 days.

(21) Appl. No.: 10/605,599

(22) Filed: Oct. 11, 2003

(65) Prior Publication Data

US 2005/0089661 A1 Apr. 28, 2005

(51) Int. Cl.
*B64G 1/58* (2006.01)

(52) U.S. Cl. .............................. 244/171.7; 220/560.15

(58) Field of Classification Search ................. 244/13, 244/171.7, 171.8; 220/560.08, 560.09, 560.11, 220/560.12, 560.15, 562, 592.25, 592.26
See application file for complete search history.

(56) References Cited

U.S. PATENT DOCUMENTS

| | | | | |
|---|---|---|---|---|
| 3,365,897 A | * | 1/1968 | Middleton et al. ............ | 62/45.1 |
| 4,168,014 A | * | 9/1979 | Schultz et al. ............ | 220/560.1 |
| 4,282,280 A | * | 8/1981 | Cook, Jr. .................... | 428/116 |
| 4,366,917 A | * | 1/1983 | Kotcharian ............ | 220/560.06 |
| 4,496,073 A | * | 1/1985 | Silver et al. ............ | 220/560.11 |
| 4,748,915 A | * | 6/1988 | Hastings et al. ............ | 109/2 |
| 4,835,975 A | * | 6/1989 | Windecker ............ | 62/45.1 |
| 4,919,366 A | * | 4/1990 | Cormier ............ | 244/159.1 |
| 5,338,383 A | * | 8/1994 | Polackowyj ............ | 156/80 |
| 5,419,139 A | * | 5/1995 | Blum et al. ............ | 62/45.1 |
| 5,460,865 A | * | 10/1995 | Tsotsis ............ | 428/116 |
| 5,542,255 A | * | 8/1996 | Preston et al. ............ | 62/45.1 |
| 5,560,569 A | * | 10/1996 | Schmidt ............ | 244/117 R |
| 6,039,832 A | * | 3/2000 | McCarville ............ | 156/292 |
| 6,133,330 A | * | 10/2000 | Weiser et al. ............ | 521/54 |
| 6,178,754 B1 | * | 1/2001 | Dujarric ............ | 62/45.1 |
| 6,347,719 B1 | * | 2/2002 | Rosen et al. ............ | 220/4.14 |
| 6,868,981 B2 | * | 3/2005 | Rosen et al. ............ | 220/560.11 |
| 6,967,051 B1 | * | 11/2005 | Augustynowicz et al. ............ | 428/68 |
| 2004/0048049 A1 | * | 3/2004 | Merrill et al. ............ | 428/209 |
| 2004/0256395 A1 | * | 12/2004 | Lak et al. ............ | 220/560.15 |
| 2005/0001100 A1 | * | 1/2005 | Hsi-Wu et al. ............ | 244/158 R |
| 2005/0089661 A1 | * | 4/2005 | Hogenson et al. ............ | 428/36.5 |
| 2005/0136239 A1 | * | 6/2005 | Eichinger et al. ............ | 428/304.4 |

\* cited by examiner

*Primary Examiner*—Timothy D. Collins
(74) *Attorney, Agent, or Firm*—Ostrager Chong Flaherty Broitman P.C.

(57) ABSTRACT

A cryogenic fuel tank assembly 10 is provided comprising a cryogenic fuel tank wall 22. A foam assembly 24 is affixed to the cryogenic fuel tank wall 22, the foam assembly 24 having an inner surface 30 and an outer surface 32. A first solid film 40 bonded to the outer surface 32 to provide a uniform outer bonding surface 42. A thermal protection system assembly 38 is bonded to the uniform outer bonding surface 42.

14 Claims, 1 Drawing Sheet

CRYOGENIC FUEL TANK INSULATION ASSEMBLY

BACKGROUND OF INVENTION

The present invention relates generally to an insulation assembly for use with cryogenic fuel tanks and more specifically to an insulation assembly having improved bonding characteristics.

Aerospace vehicle designs commonly utilize a variety of fuels to supply both launch and maneuvering power requirements. The quantity of fuel required for most missions, especially for launch requirements, often generates severe design constraints and can require considerable portions of vehicle size to be dedicated towards the carrying of fuel. The use of cryogenic fuels allows the fuels to be maintained in a liquid state rather than in their roomtemperature gaseous form. This allows a greater quantity of fuel to be stored in a smaller container. This, in turn, improves the design capabilities of aerospace vehicles.

Current cryogenic fuel tank technology for expendable launch systems such as the external tank of the space shuttle use spray-on foam insulation. This technology, however, does not commonly satisfy the strength and reusability requirements associated with multi-mission flight environments. Expendable launch systems are often not considered appropriate for integration into reusable launch vehicle designs. Reusable launch vehicle (RLV) designs often require such vehicles to carry the cryogenic fuel tanks through launch, on-orbit, and reentry. The cryogenic insulation ("cryoinsulation") is required to reduce launch pad cryogen boil-off and thermally protect fuel tanks during ground servicing, launch, on-orbit, and reentry. In addition, the cryoinsulation must be robust enough to withstand repeated thermal cycling.

Cryoinsulation is applied to the exterior of the fuel tanks and can consist of a foam insulation layer and a thermal protection system (TPS) layer. It is desirable that the bond joint between the foam insulation layer and the thermal protection system be reliable to prevent peeling or other separation during the thermal cycling and other use related stresses of RLV applications. In addition, the cryoinsulation presents an opportunity for further protection of the fuel tank structure from damage due to on-orbit particle impact. Therefore, a cryogenic fuel tank system with an improved cryoinsulation design provides the opportunity to implement a variety of improvements to RLV design and application.

It would therefore be highly desirable to have a cryogenic fuel tank assembly with improved bonding characteristics within the cryoinsulation layers. It would further be highly desirable to develop a cryogenic fuel tank assembly with improved resilience to on-orbit particle impact.

SUMMARY OF INVENTION

It is therefore an object to the present invention to provide an cryogenic fuel tank assembly with improved bonding characteristics. It is further object to the present invention to provide a cryogenic fuel tank assembly with improved resistance to on-orbit particle impact.

In accordance with the objects of the present invention a cryogenic fuel tank assembly is provided. The fuel tank assembly includes a cryogenic fuel tank wall. A foam assembly is affixed to the cryogenic fuel tank wall, the foam assembly having an inner surface and an outer surface. A first solid film bonded to the outer surface to provide a uniform outer bonding surface. A thermal protection system assembly is bonded to the uniform outer bonding surface.

Other objects and features of the present invention will become apparent when viewed in light of the detailed description and preferred embodiment when taken in conjunction with the attached drawings and claims.

DETAILED DESCRIPTION

Figure 1:
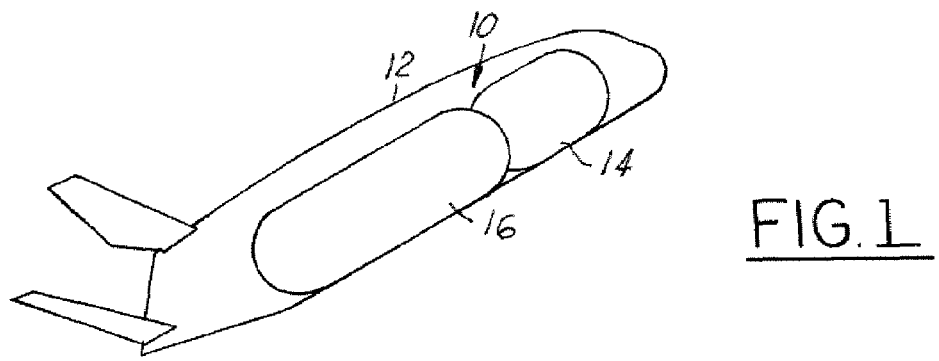
FIG. 1 is an illustration of a cryogenic fuel tank assembly in accordance with the present invention, the cryogenic fuel tank assembly illustrated within a reusable launch vehicle.

Referring now to FIG. 1, which is an illustration of the fuel tank assembly 10 in accordance with the present invention. The fuel tank assembly 10 is illustrated installed within an aerospace vehicle 12 such as a reusable launch vehicle (RLV). It should be understood that the fuel tank assembly 10 can be utilized in a wide variety of aerospace vehicles 12 and the vehicle shown is for illustrative purposes only. Similarly, the fuel tank assembly 10 is illustrated as comprising a forward fuel tank 14 and a rear fuel tank 16. It should be understood, however that the number and orientation of fuel tanks 14, 16 within the RLV 12 are contemplated to be application specific.

Figure 2:
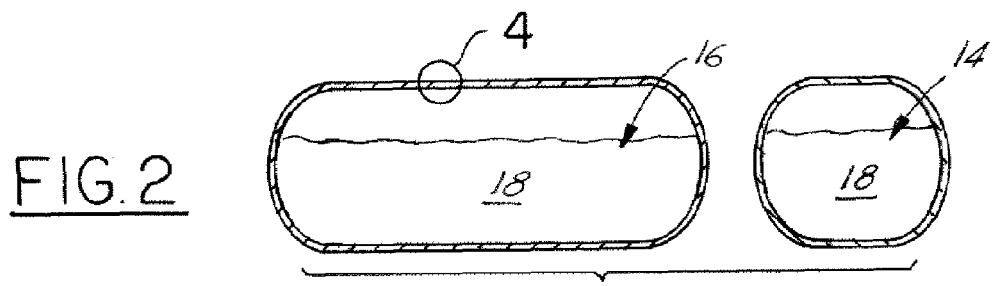
FIG. 2 is a cross-sectional illustration of the cryogenic fuel tank assembly illustrated in FIG. 1, the cross-section taken along the lines 2-2 in the direction of the arrows.
Figure 3:
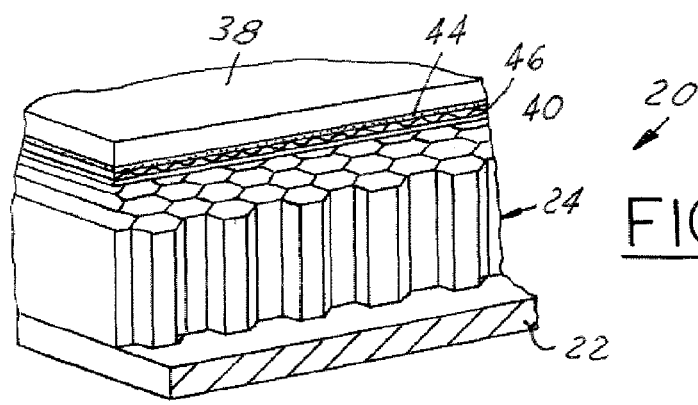
FIG. 3 is a cut-away detail of a portion of the cryogenic fuel tank assembly illustrated in FIG. 2.
Figure 4:
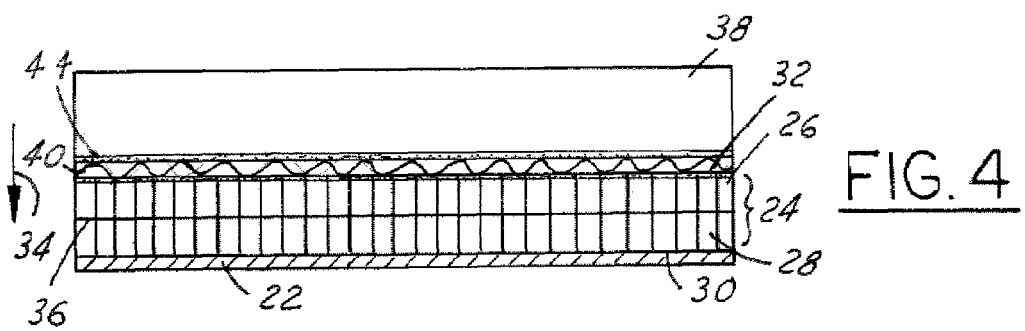
FIG. 4 is a detail illustration of a portion of the cryogenic fuel tank assembly illustrated in FIG. 2.
Figure 5:
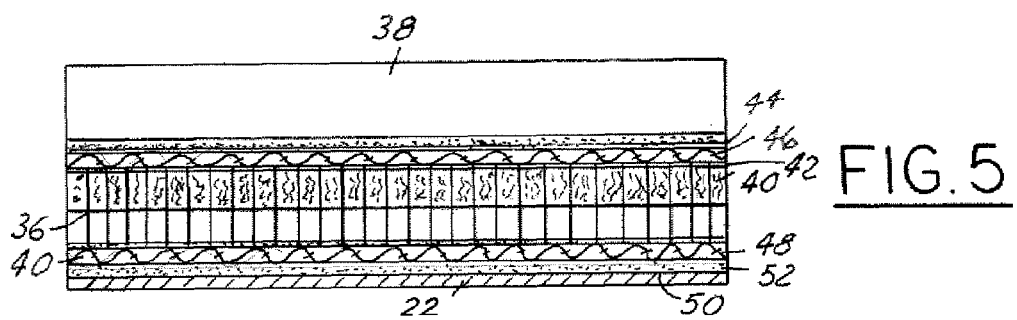
FIG. 5 is an alternate embodiment of the portion of the cryogenic fuel tank assembly illustrated in FIG. 4.

The fuel tank assembly 10 is intended to contain a cryogenic fuel supply 18 (see FIG. 2). The cryogenic fuel supply 18 must be thermally protected such that the fuel is kept within a temperature range suitable to prevent boil-off or phase change. The present invention provides a unique approach to maintaining such a temperature range through the use of an insulation system 20 illustrated in FIGS. 3 and 4 applied to the cryogenic fuel tank wall 22. The insulation system 20 includes a foam assembly 24 applied and secured to the cryogenic fuel tank wall 22. A wide variety of foam assemblies 24 are contemplated by the present invention. One embodiment contemplates a multi-layer foam assembly with individual layers such as a polyimide foam layer 26 and a polyurethane foam layer 28. The foam assembly has an inner surface 30 nearest the fuel tank wall 22 and an outer surface 32 farthest from the fuel tank wall 22. Although the foam layers 26,28 may be arranged in a variety of fashions, one embodiment contemplates placing the polyurethane foam layer 28 inboard 34 of the polyimide foam layer 26. It should be understood that a wide variety of foam assemblies 24 are contemplated.

The foam assembly 24 can further include a honeycomb core 36 positioned within the foam. A wide variety of honeycomb core 36 materials may be utilized. One embodiment contemplates the use of a 2.0-pcf-density and a ⅜-inch hexagonal cell size. The honeycomb core 36 provides a solid structural base for the foam assembly 24 and may be utilized to broaden the range of foam materials that can be utilized by the present invention by removing or reducing strength requirements from the foam material. The foam assembly 24 is positioned between the fuel tank wall 22 and a thermal protection system 38. The foam assembly 24 is affixed to both the fuel tank wall 22 and the thermal protection system 38 such that a coherent insulation system 20 is generated. Thermal protection systems 38 are well known in the art and are known to come in a variety of configurations and materials. TPS such as the ceramic tiles utilized on the space shuttle are only one example. The nature of most thermal protection systems, however, is that they are commonly comprised of semi-rigid elements.

The rigid nature of the fuel tank wall 22 and thermal protection system 38 also generates fairly smooth mating surfaces for which to affix the foam assembly 24. The inner and outer surfaces 30,32 of the foam assembly 24 (with or without the honeycomb core 36) often represent varying surfaces that can make bonding to the fuel tank wall 22 and the thermal protection system 38 difficult. This can in turn negatively impact the bond joint between the foam assembly 24 and the thermal protection system 38. The present invention improves on this situation by including a first solid film 40 bonded to the outer surface 32 of the foam assembly 24. The first solid film 40 is utilized to generate a uniform outer surface 42 that allows for improved bonding with the thermal protection system 38. An adhesive material 44 may therefore be used to bond the thermal protection system 38 to the uniform outer surface 42 with resultant improved bond strength due to the uniform outer bonding surface 42.

The present invention can further include a first fabric layer 46 which can be utilized alone or in combination with the first solid film 40. The first fabric layer 46 provides not only the uniform outer surface 42 suitable for bonding, but additionally provides an increased protection of the cryogenic fuel supply 18 from particle impact experienced in on-orbit. Resistance to orbital debris and micrometeoroid impact can be important to vehicle re-entry and landing. The use of the first fabric layer 46, such as a 1-mil thick glass fabric in one embodiment, provides additional protection by generating an additional barrier for particles that may have penetrated the thermal protection system 38. Although a single fabric material 46 has been described, it should be understood that a wide variety of fabric laminate materials may be utilized. The amount of impact protection balanced with the added weight and resultant bond strength can be utilized to evaluate potential fabric materials 46.

A second fabric layer 48 may be additionally utilized to further improve impact protection. The second fabric layer 48 is bonded to the inner surface 30 of the foam assembly 20. The second fabric layer 48 not only generates a uniform inner bonding surface 50, but when used in combination with the first fabric layer 48 further increases the impact protection of the cryogenic fuel supply 18. The second fabric layer 48 may also be utilized to improve the bond strength between the foam assembly 20 and the fuel tank wall 22. The uniform inner bonding surface 50 can be bonded to the fuel tank wall 22 in a variety of fashions. One embodiment contemplates the use of a polyurethane adhesive 52.

Although the present invention can be assembled in a variety of fashions, it is contemplated that in one embodiment the foam assembly 24, the honeycomb core 36 and the solid film 40/fabric 46, 48 layers may be assembled prior to bonding to the fuel tank wall 22 and thermal protection system 38. In this embodiment, the unered Loam assembly 24 is used to fill the honeycomb core 36. The solid film 40 and/or fabric combinations 46, 48 are ten also applied in an uncured state. The film 40 and fabric 46, 48 can then be cured to the honeycomb core 36 simultaneously with the curing of the foam assembly 24. This allows the additional strength and bonding characteristics provided by the film/fabric 40,46,48 to be imparted to the foam assembly 24 without adding time or undue manufacturing process.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

The invention claimed is:

1. A cryogenic fuel tank assembly comprising:
a cryogenic fuel tank wall;
a foam assembly affixed to said cryogenic fuel tank wall, said foam assembly having an inner surface and an outer surface;
a first solid film directly bonded to said outer surface to provide a uniform outer bonding surface; and
a semi-rigid thermal protection system assembly bonded to said uniform outer bonding surface.

2. A cryogenic fuel tank assembly as described in claim 1, wherein said foam assembly comprises a polyimide foam layer.

3. A cryogenic fuel tank assembly as described in claim 2, wherein said foam assembly further comprises a polyurethane foam layer applied inboard of said polyimide foam layer.

4. A cryogenic fuel tank assembly as described in claim 1, wherein said foam assembly comprises a polyurethane foam layer.

5. A cryogenic fuel tank assembly as described in claim 1, further comprising:
a honeycomb core positioned within said foam assembly, said honeycomb core providing a structural base for said foam assembly.

6. A cryogenic fuel tank assembly as described in claim 1, further comprising:
a silicon adhesive layer bonding said thermal protection system to said first solid film.

7. A cryogenic fuel tank assembly as described in claim 1, further Comprising:
a polyurethane adhesive layer bonding said foam assembly to said cryogenic fuel tank wall.

8. A cryogenic fuel tank assembly as described in claim 1, further comprising:
a second solid film layer bonded to said inner surface to provide a uniform inner bonding surface, said uniform inner bonding surface bonded to said cryogenic tank wall.

9. A cryogenic fuel tank assembly as described in claim 1, wherein said uniform outer bonding surface further comprises:
a first fabric layer applied to said first solid film, said first fabric layer improving impact resistance of said cryogenic fuel tank wall and generating an additional barrier for particles that may have penetrated the thermal protection system.

10. A cryogenic fuel tank assembly as described in claim 9, wherein said first fabric layer comprises a glass fabric.

11. A reusable launch vehicle assembly comprising:
a cryogenic fuel tank including at least one cryogenic fuel tank wall;
a foam assembly affixed to said cryogenic fuel tank wail, said foam assembly having an inner surface and an outer surface;
a honeycomb core positioned within said foam assembly;

a first solid film directly bonded to said outer surface to provide a uniform outer bonding surface to provide a uniform outer bonding surface; and a semi-rigid thermal protection system assembly bonded to said uniform outer bonding surface.

12. A reusable launch vehicle assembly as described in claim 11, further comprising:

a first fabric layer applied to said first solid film, said first fabric layer improving impact resistance of said cryogenic fuel tank wall and generating an additional battier for particles that may have penetrated the thermal protection system.

13. A reusable launch vehicle assembly as described in claim 11, farther comprising:

a second solid film bonded to said inner surface to provide a uniform inner bonding surface, said uniform inner bonding surface bonded to said cryogenic tank wall.

14. A reusable launch vehicle assembly as described in claim 13, further comprising:

a second fabric layer applied to said second solid film, said second fabric layer improving impact resistance of said cryogenic fuel tank wall.

* * * * *